United States Patent
Perry et al.

(10) Patent No.: US 6,786,965 B2
(45) Date of Patent: Sep. 7, 2004

(54) ORGANIC PIGMENT DISPERSION FOR COLORING BUILDING MATERIALS

(75) Inventors: Charles W. Perry, Cincinnati, OH (US); Donald C. Dulaney, Waukesha, WI (US); James Moore, Cincinnati, OH (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 10/148,037

(22) PCT Filed: Dec. 4, 2000

(86) PCT No.: PCT/US00/42510

§ 371 (c)(1), (2), (4) Date: Sep. 9, 2002

(87) PCT Pub. No.: WO01/40133

PCT Pub. Date: Jun. 7, 2001

(65) Prior Publication Data

US 2003/0047118 A1 Mar. 13, 2003

(51) Int. Cl.⁷ .......................... C04B 16/00; C04B 20/02; C09D 17/00

(52) U.S. Cl. ........................ 106/491; 106/410; 106/412; 106/493; 106/496; 106/497; 106/498; 106/712

(58) Field of Search ................................ 106/410, 412, 106/491, 493, 496, 497, 498, 712, 413

(56) References Cited

U.S. PATENT DOCUMENTS

| | | | |
|---|---|---|---|
| 2,549,516 A | 4/1951 | Parry | 117/70 |
| 3,929,692 A | 12/1975 | Offerman | 260/7.5 |
| 4,134,956 A | 1/1979 | Suzuki et al. | 264/256 |
| 4,946,505 A | 8/1990 | Jungk | 106/712 |
| 5,401,313 A | 3/1995 | Supplee et al. | 106/712 |
| 5,484,481 A | 1/1996 | Linde et al. | 106/712 |
| 5,853,476 A | 12/1998 | Will | 106/712 |
| 5,882,395 A | 3/1999 | Linde et al. | 106/460 |
| 5,897,698 A * | 4/1999 | Bellas | 106/416 |
| 5,934,513 A * | 8/1999 | Bellas | 222/144 |
| 6,239,201 B1 * | 5/2001 | Edelmann et al. | 524/148 |

FOREIGN PATENT DOCUMENTS

| | | | |
|---|---|---|---|
| DE | 2604569 A1 | * | 8/1977 |
| EP | 742186 | * | 11/1996 |
| JP | 56-67371 A | * | 6/1981 |
| JP | 60-081012 | * | 5/1995 |
| JP | 2002-373608 A | * | 12/2002 |

OTHER PUBLICATIONS

American Society for Testing and Materials; Standard Specification for Pigments Used to Integrally Color Concrete; ASTM C979–82, no date.

* cited by examiner

Primary Examiner—Anthony J. Green
(74) Attorney, Agent, or Firm—Sidney Persley

(57) ABSTRACT

An aqueous organic pigment dispersion used to integrally color concrete and other building materials which includes: alkali metal silica particles as a binder; organic pigment; water; and dispersing agent in an amount effective to disperse the organic pigment and the binder in the water. A method for preparing the aqueous organic pigment dispersion includes (i) mixing, at 3,000 to 10,000 rpm, alkali metal silica particles; organic pigment; and dispersing agent, thereby forming a dispersion premix; (ii) milling the dispersion precursor in a mixer filled with glass beads for a period of time sufficient to reduce the particle size of the organic pigment to about 100 to about 300 nanometers, thereby forming a non-standardized dispersion; and (iii) standardizing the dispersion against a color standard by adding water.

13 Claims, No Drawings

ORGANIC PIGMENT DISPERSION FOR COLORING BUILDING MATERIALS

BACKGROUND OF THE INVENTION

1. Field of the Invention

This invention relates to an aqueous dispersion of organic pigment suitable for coloring building materials such as concrete, asphalt, plaster, mortar and cement mortar. More particularly, this invention relates to aqueous dispersions which contain silica binder, an organic pigment and dispersing agent.

2. Description of the Prior Art

It is desirable to color exposed concrete surfaces for both aesthetic and functional reasons. Colored concrete buildings do not present an environment as sterile and cold as white concrete. In addition, light colors can be used in sunny climates to help reduce glare while darker colors may be used to increase a building's heat storage capacity in cooler climates.

Coloring the exposed surface by painting or by coating the surface with some other decorative layer is known. U.S. Pat. Nos. 2,549,516; 3,929,692 and 4,1311,956 disclose compositions for covering exposed concrete surfaces. However, painting or application of a coating layer is an additional step in construction which adds cost and complexity to a construction project. Moreover, an exterior painted surface may require repainting in a relatively short period of time.

Another approach is to add a color additive to the building material, thereby eliminating the extra step associated with painting the building surface. However, any color additive must be uniformly dispersed throughout the building material. This can be difficult given the low intensity mixing and short mixing times customary in the building materials industry. Moreover, the additive must not adversely affect the desirable properties of the building material such as the strength or setting behavior of concrete or reduce the compressive strength or abrasion resistance of asphalt. See ASTM C 979-82 "Standard Specification for Pigments for Integrally Colored Concrete," which contains some of the industry association standards for coloring concrete.

Inorganic pigments are typically used as color additives for building materials and typically include iron oxides (natural and synthetic), chromium oxide, cobalt blue, titanium dioxide and carbon black. However, these inorganic pigments offer a limited ranges of colors and brightness.

Organic pigments have not been used to color building materials as it is believed they lack sufficient alkali resistance and lightfastness. In 1981 the American Society for Testing and Materials (ASTM) in a report entitled "Pigments for Integrally Colored Concrete," discussed the test results of various inorganic and organic pigments for lightfastness, alkali resistance, water wettability and curing stability. All of the organic pigments tested, including phthalocyanine green, failed to meet the lightfastness testing standards.

Dry pigment powders have been used to color concrete compositions because they are highly dispersible. However, these powders have poor processing properties, and typically cake together and form lumps upon storage. They also tend to form dust.

The use of free flowing granules or heads to overcome the processing problems and dust associated with dry pigment powders has been suggested. These granules may be produced by spray drying aqueous dispersions, as proposed by U.S. Pat. Nos. 4,946,505; 5,484,481; 5,853,476; and 5,882,395. However, the evaporation of the aqueous dispersion requires expensive equipment and significant energy expenditures which can make the use of such granules economically unattractive.

Another approach is to modify the particle's surface to improve its dispersibility in aqueous solution. U.S. Pat. No. 5,401,313 discloses a pigment particle whose surface is coated with an electric charge modifying agent and a dispersion promoting agent. The dispersion promoting agent is selected from stearates, acetates, alkylphenols, cellulosics, waxes, lignins, acrylics, epoxies, urethanes, ethylenes, styrenes, propylenes and polymers having functions groups of alcohols, glycols, aldehydes, amides and carboxylic acids, and is preferably sodium lignosulfonate for cementitious application systems. The surface-modified particle may be produced in powder, dispersion or granular form, with bead granules having a particle size of 25 to 250 microns being preferred.

An object of the invention is to provide aqueous organic pigment dispersions for coloring concrete and which exhibit acceptable alkali resistance and lightfastness.

The inventive dispersion is a combination of organic pigment, silica and water.

An advantage of the present invention is the ability to color building materials such as concrete with bright organic pigments that do not suffer from poor alkali resistance and/or poor lightfastness.

Another advantage of the present invention is that it permits the ready removal of graffiti or other surface defacement from a concrete surface without impairing its surface appearance.

SUMMARY OF THE INVENTION

In one aspect, the present invention relates to an aqueous based organic pigment dispersion, comprising
  (i) silica binder;
  (ii) organic pigment;
  (iii) dispersing agent; and
  (iv) water.

In another aspect, the present invention relates to a method for preparing organic pigment dispersions which includes
  (i) mixing, at 3,000 to 10,000 rpm, a silica binder, organic pigment and dispersing agent, to form a dispersion premix;
  (ii) milling the dispersion premix in a mixer filled with glass beads for a period of time sufficient to reduce the particle size of the organic pigment to from about 100 to about 300 nanometers, thereby forming a non-standardized dispersion;
  (iii) adding water to the non-standardized dispersion until it matches a color standard and forms an organic dispersion.

DETAILED DESCRIPTION OF THE PREFERRED EMBODIMENTS

Any silica may be used in the organic dispersion of the present invention if it is effective to cause the pigment to adhere to the building material. Suitable silicas include silicate, metasilicate pentahydrate, sesquisilicate and orthosilicate. Alkali metal silicates are preferred, with sodium and potassium silicates being especially preferred. Such silicates are commercially available as aqueous dispersions.

Any organic pigment can be used in the organic dispersion of the present invention if it exhibits good alkali resistance and light resistance, as determined according to ASTM C 979-82, herein incorporated in its entirety by reference. Thus, those organic pigments which cannot withstand a pH of 10 or greater will not be useful in the aqueous pigment dispersion of the present invention. Suitable organic pigments may be chosen from azo pigments, such as azo lake, azo chelate and condensed azo pigments, and polycyclic pigments such as phthalocyanine pigments, perylene pigments, perinone pigments, anthraquinone pigments, quinacridone pigments, dioxazine pigments, thioindigo pigments, isoindolinone pigments and quinophethalone pigments.

Preferred organic pigments are selected from phthlalocyanine green, phthalocyanine blue, carbazole violet, toluidine red perylene red, quinacridone red, quinacridone yellow, Dalamar yellow and Watchung red.

Any dispersing agent can be used in the organic dispersion of the present invention provided that it effectively disperses the binder and organic pigment in water. A given dispersing agent's effectiveness can be optimized by varying the amount of dissolved silica present and by adjusting the dispersion's pH to between 1.0 and 14, preferably between 11 and 12. Suitable dispersing agents include alkylbenzene sulfonic acid salts, alkylnaphthalene sulfonic acid salts, naphthalene sulfonic acid salts, melamine-formaldehyde condensates, polysaccharide resins, sytrenated acrylic resins, octylphenol polyethoxylated surfactants, non-ionic acetylenic diol surfactants, ethoxylated oleyl alcohol surfactants and phosphate ester surfactants. A sodium salt of naphthalenesufonic acid, commercially available from Rohm & Haas Co. under the trademark TAMOL SN, is preferred along with diethylene glycol monomethyl ether acetate.

The organic pigment dispersions of the present invention typically contain at least 10% by weight silica, at least 30% by weight of organic pigment, at least 1% by weight dispersing agent, with the remainder water. The dispersing agent is typically present in an amount or from 1–10%, preferably 1–5%, by weight. Silica is preferably present in an amount of at least 30% by weight.

Other compounds may be present in any amount which does not detract from the organic dispersion's effectiveness in integrally coloring building materials such as concrete. Hydroxyalkyl celluloses, such as hydroxyethylcellulose, are preferably added to the aqueous dispersion to increase its viscosity to a range of from 800 to 10,000 centipoise, preferably 1,000 to 2,000 centipoise, at 25° C. The amount of viscosity additive will depend on the relative amounts of dispersing agent, binder, organic pigment and water forming the dispersion, and may range from 0.1% to 2% by weight of the dispersion.

The organic pigment dispersions of the present invention may be prepared by a three-stage process. In the first stage, the silica binder, organic pigment and dispersing agent are mixed together in the desired amounts to form a dispersion premix which contains the dispersing agent and organic pigment uniformly distributed throughout the silica binder. Conventional high speed mixing equipment may be used without modification under the trade name Dispersmat. A mixing speed of from 3,000 to 10,000 rpm for a time period of from 1 minute to 2 hours, preferably 10–25 minutes, may be used depending on the size of the batch.

In the second stage, the dispersion premix is media milled, typically using glass milling beads, to reduce the size of the organic pigment particles to an average particle size range of from about 100 to about 300 nanometers, thereby forming a non-standardized dispersion. Media milling can be performed using conventional milling equipment without modification.

In the third and final stage, water is added to the non-standardized dispersion until the color of the dispersion matches a color standard. Generally from 5 to 10%, by weight, water is required to standardize the dispersion.

Without intending to be bound by theory, the inventors currently believe that the alkali metal silica particles chemically reacts with the building material, thereby "locking" the pigment into the building material and preventing washout of the color, with no reduction in strength of the building material. This chemical reaction prevents streaking and staining of the integrally colored concrete over time, and eliminates any need for an overcoat.

The organic dispersion of the present invention may be used to integrally color building materials such as cement, asphalts, plaster, mortar and cement mortar at the construction site. More particularly, the organic dispersion may be added to the building material as it is being formulated. Thus, for example, from 0.5% to 10% by weight, preferably 2–3% by weight, of the organic dispersion may be added to a concrete mixer containing Portland cement, sand/gravel aggregate and water, and homogenized for approximately 15–30 minutes. The resulting mixture may be poured into a prepared mold and allowed to harden to form integrally colored concrete.

The following examples illustrate preferred embodiments of the invention, and are not intended to limit the scope of the invention in any manner whatsoever.

EXAMPLE 1

Formulation of an Organic Dispersion

A high speed mixer was used to mix potassium silicate, hydroxyethylcellulose, phthalocyanine green (C.I. Pigment Green 7), the sodium salt of naphthalenesulfonic acid (TAMOL SN, commercially available from Rohm & Haas Co.) and water to form a dispersion precursor, which was then media milled (Eiger mixer) to disperse and incorporate the pigment into the binder system. The resulting organic dispersion had a resin solids (potassium silicate binder) percentage of 13.60% and a total solids percentage of 56.60%. The weight percentage composition of the organic dispersion is set forth below in Table 1:

TABLE 1

| MATERIALS | WEIGHT PERCENTAGES |
| --- | --- |
| Potassium Silicate Binder | 74.00 |
| Pigment Green 7 | 20.0 |
| TAMOL SN Dispersing Agent | 2.0 |
| Water | 4.0 |
| TOTAL | 100% |

EXAMPLE 2

Formulation of an Organic Dispersion

Several other organic dispersions were formulated using the general procedures of Example 1. The composition weight percentages of the various materials of these organic dispersions are set forth below in Table 2.

TABLE 2

| MATERIALS | II-1 | II-2 | II-3 |
|---|---|---|---|
| Binder | | | |
| Potassium Silicate | 35.00 | | 13 |
| Sodium Silicate | | 25.00 | |
| Organic Pigment | | | |
| Pigment 7 Green | | | |
| Pigment Blue 15:3 | 30.00 | 30.00 | 33.0% |
| Dispersing Agent | | | |
| TAMOL SN | 4.5 | 4.50 | 6% |
| Water | 30.50 | 40.5% | 48% |

EXAMPLE 3

Integrally Coloring Concrete

The organic dispersions of Examples 1 and 2 were each individually used to integrally color concrete by mixing an appropriate amount (1%) of the dispersion with concrete in a laboratory mixer for approximately 15 minutes. Each of the organic dispersions readily became part of the concrete matrix.

What is claimed is:

1. An organic pigment dispersion comprising:
   (i) silica binder;
   (ii) organic pigment;
   (iii) dispersing agent; and
   (iv) water.

2. The organic dispersion of claim 1, wherein the silica binder is selected from the group consisting of silicate, metasilicate pentahydrate, sesquisilicate and orthosilicate.

3. The organic dispersion of claim 2, wherein the silica is a sodium silicate.

4. The organic dispersion of claim 1, wherein said organic pigment is selected from the group consisting of phthalocyanine green, phthalocyanine blue, carbazole violet, toluidine red, Dalamar yellow and Watchung red.

5. The organic dispersion of claim 1, wherein said organic pigment is a phthalocyanine.

6. The organic dispersion of claim 1, wherein said dispersing agent is selected from the group consisting of an alkylbenzene sulfonic acid salt, an alkylnaphthalene sulfonic acid salt, a naphthalene sulfonic acid salt, a melamine-formaldehyde condensates, a polysaccharide resin, a sytrenated acrylic resin, an octylphenol polyethoxylated surfactant, a non-ionic acetylenic diol surfactant, an ethoxylated oleyl alcohol surfactant and phosphate ester surfactant.

7. The organic dispersion of claim 6, wherein said dispersing agent is a sodium salt of naphthalene sulfonic acid.

8. The organic dispersion of claim 5, wherein said dispersing agent is diethylene glycol monomethyl ether acetate.

9. The organic dispersion of claim 1, further comprising a hydroxyalkylcellulose.

10. The organic dispersion of claim 9, wherein said hydroxyalkylcellulose is a hydroxyethylcellulose.

11. The organic dispersion of claim 1, wherein said organic pigment has an average particle size of from 100 to 300 nanometers.

12. A process for preparing an organic pigment dispersion, comprising:
   (i) mixing at 3,000 to 10,000 rpm, a silica binder, organic pigment and dispersing agent to form a dispersion premix;
   (ii) milling the dispersion premix in a mixer filled with glass beads for a period of time sufficient to reduce the particle size of the organic pigment to about 100 to about 300 nanometers, thereby forming a non-standardized dispersion; and
   (iii) adding water to the non-standardized dispersion until it matches a color standard and forms an organic dispersion.

13. A colored building material, comprising the organic pigment dispersion of claim 1 dispersed in a building material.

* * * * *